United States Patent
Lee et al.

(10) Patent No.: US 10,491,735 B2
(45) Date of Patent: Nov. 26, 2019

(54) METHOD AND APPARATUS FOR CONTROLLING VOLUME BY USING TOUCH SCREEN

(71) Applicant: Samsung Electronics Co., Ltd., Gyeonggi-do (KR)

(72) Inventors: Seungyun Lee, Gyeonggi-do (KR); Younghoon Kwak, Gyeonggi-do (KR); Dongkyu Kim, Seoul (KR); Yu-Jeong Jeon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 598 days.

(21) Appl. No.: 15/088,595

(22) Filed: Apr. 1, 2016

(65) Prior Publication Data

US 2016/0291928 A1   Oct. 6, 2016

(30) Foreign Application Priority Data

Apr. 1, 2015   (KR) .................. 10-2015-0046369

(51) Int. Cl.
  *H04M 1/725* (2006.01)
  *G06F 3/0488* (2013.01)

(52) U.S. Cl.
  CPC ...... *H04M 1/72519* (2013.01); *G06F 3/0488* (2013.01); *G06F 2203/04104* (2013.01); *G06F 2203/04803* (2013.01); *H04M 2250/22* (2013.01)

(58) Field of Classification Search
  CPC .......... H04M 1/72519; H04M 2250/22; G06F 3/0488; G06F 2203/04803; G06F 2203/04104
  See application file for complete search history.

(56) References Cited

U.S. PATENT DOCUMENTS

| | | | |
|---|---|---|---|
| 2006/0197750 A1* | 9/2006 | Kerr | G06F 1/1626 345/173 |
| 2011/0012850 A1* | 1/2011 | Melnyk | G06F 3/0487 345/173 |
| 2014/0118271 A1 | 5/2014 | Lee et al. | |
| 2014/0203244 A1 | 7/2014 | Hack et al. | |
| 2015/0042588 A1* | 2/2015 | Park | G06F 3/0412 345/173 |
| 2015/0058810 A1* | 2/2015 | Chang | G06F 1/1626 715/863 |
| 2015/0153909 A1* | 6/2015 | Zubas | G06F 1/1694 715/840 |

FOREIGN PATENT DOCUMENTS

| | | |
|---|---|---|
| KR | 1020100042833 | 4/2010 |
| KR | 1020120060556 | 6/2012 |
| KR | 1020140054746 | 5/2014 |
| KR | 1020140093614 | 7/2014 |
| KR | 101461004 | 11/2014 |

\* cited by examiner

*Primary Examiner* — Renee D Chavez
*Assistant Examiner* — Ayesha E Huertas Torres
(74) *Attorney, Agent, or Firm* — The Farrell Law Firm, P.C.

(57) ABSTRACT

An electronic device and a method are provided for controlling volume. The electronic device includes a touch screen including a main area on a front surface of the electronic device and an auxiliary area formed on a side of the main area; and a controller configured to detect a touch area contacted on the auxiliary area in a call mode, to determine the auxiliary area as a volume control area based on the touch area, and to control volume according to a touch event input in the volume control area.

18 Claims, 12 Drawing Sheets

METHOD AND APPARATUS FOR CONTROLLING VOLUME BY USING TOUCH SCREEN

PRIORITY

This application claims priority under 35 U.S.C. § 119(a) to Korean Patent Application Serial No. 10-2015-0046369, which was filed in the Korean Intellectual Property Office on Apr. 1, 2015, the entire content of which is incorporated herein by reference.

BACKGROUND

1. Field of the Disclosure

The present disclosure relates generally to a method and an apparatus and more particularly to a method and apparatus for controlling volume by using a touch screen.

2. Description of the Related Art

While electronic devices commonly have display areas (for example, an LCD or a touch screen) on the front surface thereof, more recent electronic devices have display areas on side surfaces as well. The electronic devices with display areas on the front surfaces also normally include hardware keys such as a volume up/down key and a lock key on side their surfaces. However, if an electronic device has a display area on a side surface thereof, the electronic device has a limitation in including or adding hardware keys.

SUMMARY

An aspect of the present disclosure is to provide a method and an apparatus for controlling a volume through a side surface of a touch screen.

In accordance with an aspect of the present disclosure, an electronic device is provided. The electronic device includes a touch screen including a main area on a front surface of the electronic device and an auxiliary area formed on a side of the main area; and a controller configured to detect a touch area contacted on the auxiliary area in a call mode, to determine the auxiliary area as a volume control area based on the touch area, and to control volume according to a touch event input in the volume control area.

In accordance with another aspect of present disclosure, a method is provided for controlling a volume of an electronic device comprising a touch screen including a main area on a front surface and an auxiliary area formed on a side of the main area. The method includes entering a call mode; detecting a touch area contacted on the auxiliary area; determining the auxiliary area as a volume control area based on the touch area; and controlling volume according to a touch event input in the volume control area.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1A:
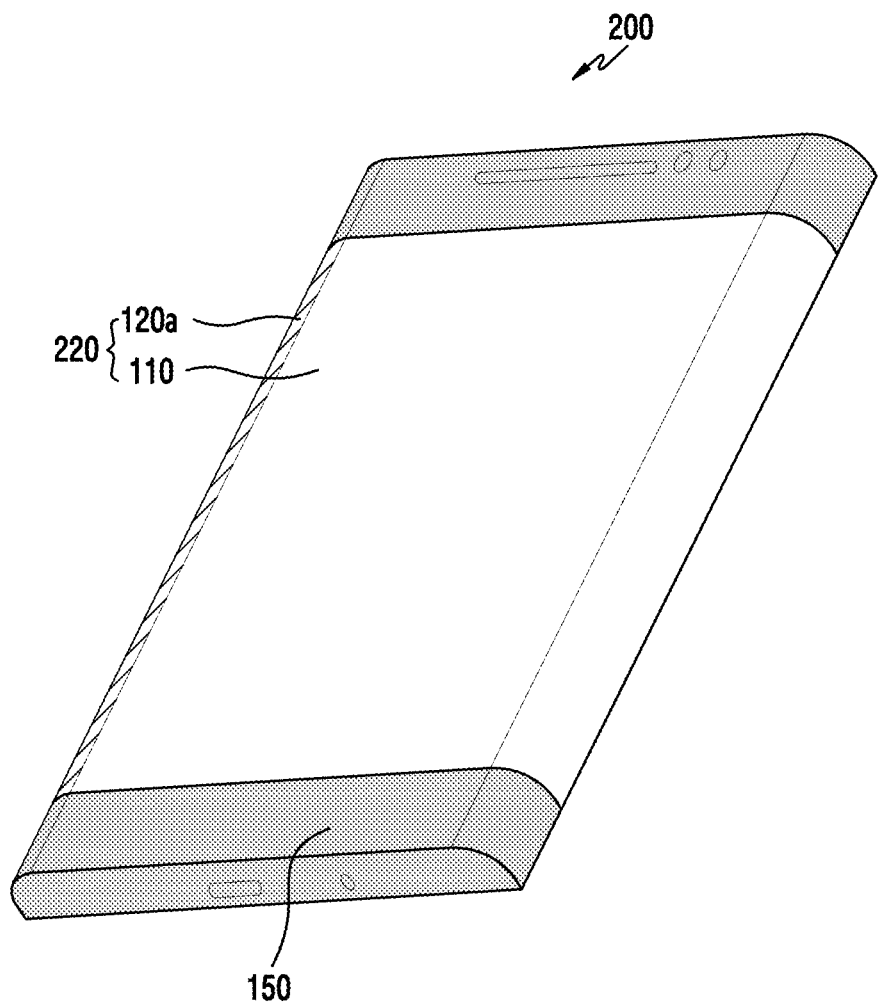
FIGS. 1A to 1C illustrate examples of an electronic device according to various embodiments of the present disclosure.

Hereinafter, various embodiments of the present disclosure will be described with reference to the accompanying drawings. However, it should be understood that there is no limiting the present disclosure to the particular forms disclosed herein, rather, the present disclosure should be construed to cover various modifications, equivalents, and/or alternatives of embodiments of the present disclosure. In describing the drawings, similar reference numerals may be used to designate similar constituent elements.

The terms used herein are merely for the purpose of describing particular embodiments and do not limit the scope of other embodiments. Singular forms may include plural forms as well unless the context clearly indicates otherwise. Unless defined otherwise, all terms used herein, including technical terms and scientific terms, may have the same meanings as commonly understood by a person of ordinary skill in the art to which the present disclosure pertains. Terms such as those defined in commonly used dictionaries, should be interpreted as having meanings that are consistent with their meanings in the context of the relevant art and will not be interpreted in idealized or overly formal senses, unless expressly defined as such herein. In some cases, even a term defined in the present disclosure should not be interpreted to exclude embodiments of the present disclosure.

In the present disclosure, the expressions "have", "may have", "include" and "may include" refer to the existence of a corresponding feature (e.g., numerical value, function, operation, or components such as elements), and do not exclude the existence of additional features.

The expressions "A or B", "at least one of A and/or B", or "one or more of A and/or B" may include all possible combinations of the items listed. For example, the expressions "A or B", "at least one of A and B", or "at least one of A or B" may include (1) at least one A, (2) at least one B, or (3) both at least one A and at least one B.

The expressions such as "first", "second", and the like, may modify various elements regardless of order or importance, and do not limit corresponding elements. The above expressions are used merely for the purpose of distinguishing an element from the other elements. For example, a first user device and a second user device indicate different user devices although both of them are user devices. For example, a first element may be referred to as a second element, and similarly, a second element may be referred to as a first element without departing from the scope of the present disclosure.

When an element (e.g., a first element) is referred to as being (operatively or communicatively) "connected," or "coupled," to another element (e.g., a second element), the first element may be directly connected or directly coupled to the second element or another element (e.g., a third element) may be interposed therebetween. In contrast, when the first element is referred to as being "directly connected," or "directly coupled" to the second element, there are no elements interposed therebetween.

The expression "configured to" may be exchanged with, for example, "suitable for", "having the capacity to", "designed to", "adapted to", "made to", or "capable of" according to context. The term "configured to" may not necessarily imply "specifically designed to" in hardware. Alternatively, in some situations, the expression "device configured to", may mean that the device, together with other devices or components, "is able to". For example, the phrase "processor adapted (or configured) to perform A, B, and C may mean a dedicated processor (e.g. embedded processor) only for performing the corresponding operations or a general-purpose processor (e.g., central processing unit (CPU) or application processor (AP)) that may perform the corresponding operations by executing one or more software programs stored in a memory device.

An electronic device according to an embodiment of the present disclosure may include all types of devices including a touch screen. For example, the electronic device may be a smart phone, a tablet personal computer (PC), a mobile phone, a video phone, an e-book reader, a laptop PC, a netbook computer, a personal digital assistant (PDA), a portable multimedia player (PMP), an MP3 player, a camera, or a wearable device (for example, a smart eye-glasses, a head-mounted-device (HMD).

The electronic device may also be a flexible device.

The electronic device may also be a combination of one or more of the aforementioned various devices.

Further, the electronic device is not limited to the aforementioned devices, and may include a new electronic device according to the development of new technology.

An electronic device according to an embodiment of the present disclosure may include a touch screen divided into a main area on a front surface and an auxiliary area on a side surface, and a controller that independently or dependently controls the main area and the auxiliary area for a display and/or a function execution.

The main area and the auxiliary as described below may be used to divide one display area into two areas. That is, the main area may be construed as a first area and the auxiliary area may be construed as a second area. For example, when the electronic device includes one main area and two auxiliary areas, the one main area may be construed as a first area, one auxiliary area may be construed as a second area, and the other auxiliary area may be construed as a third area.

Figure 1B:
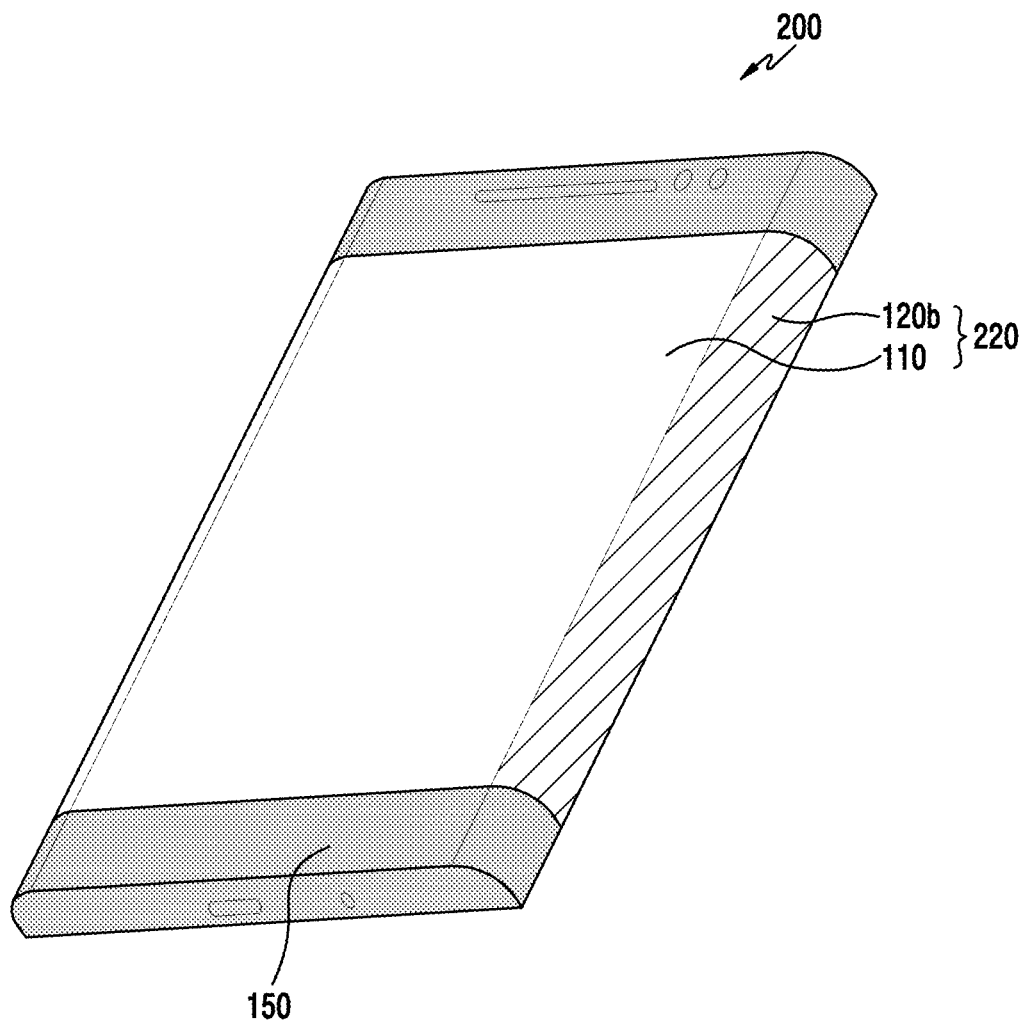
Figure 1C:
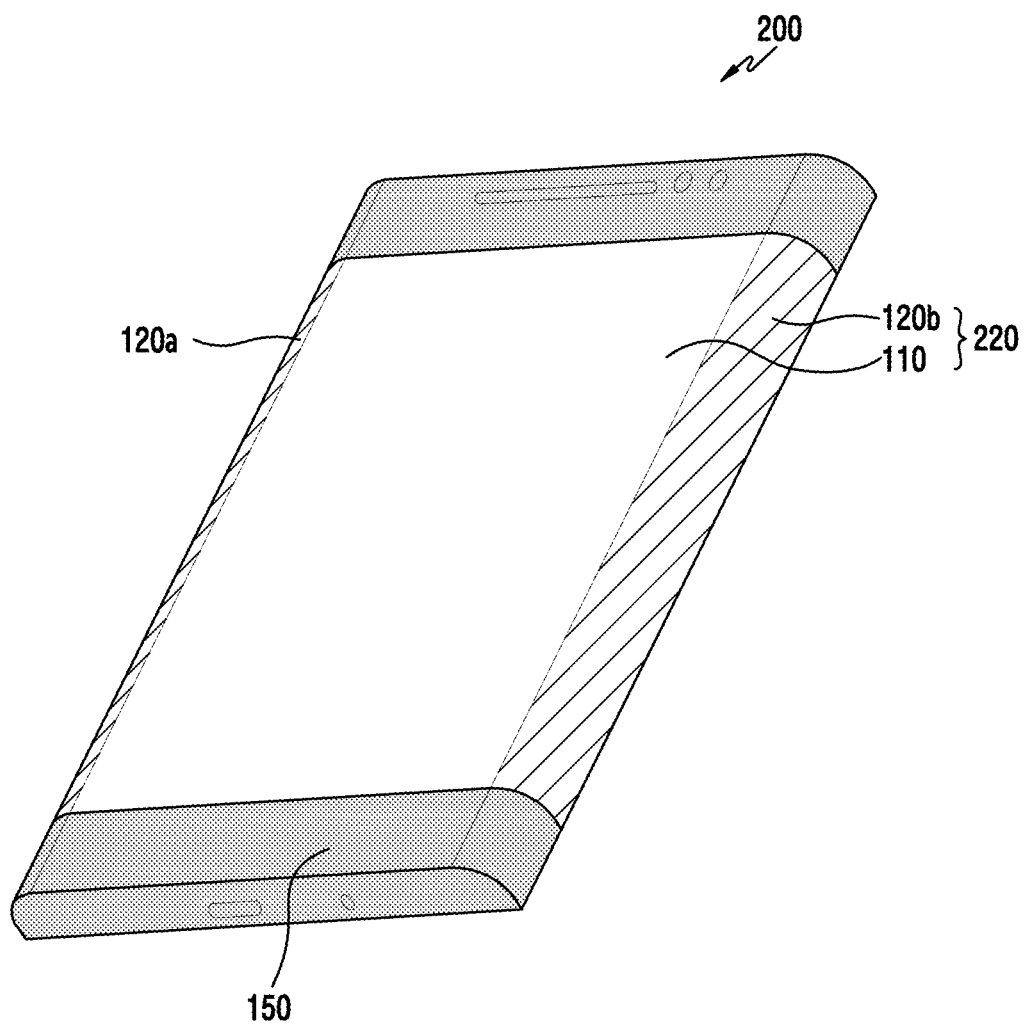

FIGS. 1A to 1C illustrate examples of an electronic device according to various embodiments of the present disclosure.

Referring to FIGS. 1A to 1C, an electronic device 200 includes a touch screen 220 divided into a main area 110 on the front surface, and a first auxiliary area 120a and/or a second auxiliary area 120b on the side surfaces, and a body 150 on which the touch screen 220 is coupled with. The body 150 may include additional devices, for example, a speaker, a microphone, sensors (for example, an illumination sensor and a front camera), a connection interface (for example, a charging port, a data input/output port, and an audio input/output port), and a physical or software button for performing functions of the electronic device. The front surface corresponds to the surface which a user views when looking at the electronic device 200 from the front and the side surfaces correspond to surfaces formed on left/right sides of the main area 110 and having a predetermined side area.

According to an embodiment of the present disclosure, the electronic device 200 may include the auxiliary area on only one of the right and left side surfaces of the main area 110, or may include the auxiliary areas on both sides. For example, as illustrated in FIG. 1A, the electronic device 200 may include the first auxiliary area 120a on the left side surface of the main area 110. For example, as illustrated in FIG. 1B, the electronic device 200 may include the second auxiliary area 120b on the right side surface of the main area 110. Alternatively, as illustrated in FIG. 1C, the electronic device 200 may include the first auxiliary area 120a and the second auxiliary area 120b on both side surfaces of the main area 110. The touch screen 220 may be integrally formed to include the main area 110 and the auxiliary area 120a and/or 120b.

Hereinafter, the auxiliary area formed on the left side of the front surface part is referred to as the first auxiliary area 120a and the auxiliary area formed on the right side is referred to as the second auxiliary area 120b. The areas are divided only for description and do not limit the scope of the present disclosure.

Although FIGS. 1A to 1C illustrate that the first auxiliary area 120a and the second auxiliary area 120b are formed vertically on the side surfaces of the main area 110, the auxiliary areas are not limited to this configuration. For example, the auxiliary areas may be formed horizontally on the side surfaces of the main area 110.

Figure 2:
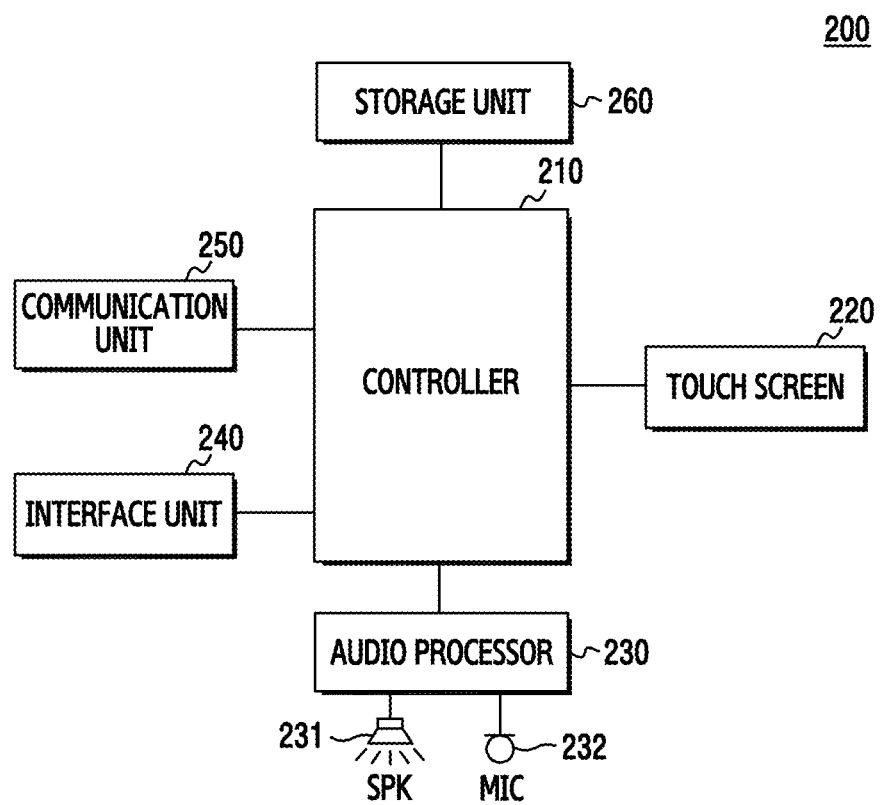
FIG. 2 is a block diagram illustrating a configuration of an electronic device according to an embodiment of the present disclosure.

FIG. 2 is a block diagram illustrating a configuration of an electronic device according to an embodiment of the present disclosure.

Referring to FIG. 2, the electronic device 200 includes a controller 210, a touch screen 220, an audio processor 230, an interface unit 240, a communication unit 250, and a storage unit 260.

The controller 210 controls the general operation of the electronic device 200 and a signal flow between internal elements of the electronic device 200, performs a function of processing data, and controls power supply to the elements from a battery. For example, the controller 210 may be at least one of a central processing unit (CPU), an application processor (AP), and a communication processor (CP).

When entering a call mode, the controller 210 may detect a touch area contacted on the auxiliary area of the touch screen 220 and determine a volume control area based on the detected touch area. The touch area may be a touch spatial area contacted on the auxiliary area of the touch screen 220 when the user grips the electronic device 200. The volume control area may include a volume up area and a volume down area. For example, the controller 210 may divide one auxiliary area (for example, 120a of FIG. 1A or 120b of FIG. 1B) into two areas and designate the divided areas as the volume up area and the volume down area, respectively. Alternatively, the controller 210 may designate one auxiliary area (for example, 120a of FIG. 1C) of the touch screen 220 as the volume up area and the other auxiliary area (for example, 120b of FIG. 1C) as the volume down area.

When a touch event is input into the volume control area, the controller 210 may control the volume according to the touch event.

The touch screen 220 may be formed to include a display panel for displaying information processed in the electronic device 200 and a touch panel for detecting a touch input in a mutual layer structure. The touch screen 220 may be divided into a front main area (for example, 110 of FIGS. 1A to 1C) and a side auxiliary area (for example, 120a and/or 120b of FIGS. 1A to 1C). The main area may be an area which the user views when looking at the electronic device 200 from the front, and the first auxiliary area 120a and/or the second auxiliary area 120b may be areas formed on side surfaces of the main area 110 and having a predetermined spatial area. The first auxiliary area 120a and/or the second auxiliary area 120b may be extended from the main area 110 or may be formed independently from the main area 110.

The display panel displays (outputs) information processed in the electronic device 200. For example, when the electronic device 200 is in a call mode, the display panel may display a call-related user interface (UI) or graphical user interface (GUI). The display panel may include at least one of a liquid crystal display (LCD), a thin film transistor-liquid crystal display (TFT LCD), a light emitting diode (LED), organic light emitting diodes (OLEDs), an active matrix organic light-emitting diode (AMOLED), a flexible display, a bendable display, and a 3D display. Some of the displays may be implemented as a transparent display configured in a transparent or photo-transparent type such that the outside light may be viewed through the transparent display.

The touch panel may be implemented as an add-on type in which the touch panel is located on the screen of the display panel, or an on-cell type or an in-cell type in which the touch panel is inserted into the display panel. The touch panel may generate a touch signal for controlling an operation of the electronic device 200 by the user. The touch panel may be configured to convert a change in pressure applied to a particular part of the display panel or in capacitance generated in a particular part of the display panel into an electrical input signal. The touch panel may be configured to detect not only a touched location and area but also pressure of the touch. Particularly, the touch panel may recognize not only one touch point (for example, a single touch) but also several simultaneous touch points (for example, multi-touch). When there is a touch input on the touch panel, a signal(s) corresponding to the touch input is delivered to a touch controller. After processing the signal(s), the touch controller transmits corresponding data to the controller 210. Accordingly, the controller 210 may determine which area of the display is touched.

The audio processor 230 performs a function of transmitting an audio signal received from the controller 210 to a speaker 231 and delivering an audio signal such as a voice received from a microphone 232 to the controller 210. The audio processor 230 may convert voice/sound data into an audible sound and output the audible sound through the speaker 231 under control of the controller 210, and may convert an audio signal such as a voice received from the microphone 232 into a digital signal and deliver the digital signal to the controller 210.

The speaker 231 may output audio data received from the communication unit 250 in a call mode, a recording mode, a voice recognition mode, and a broadcast receiving mode, or stored in the storage unit 260. The speaker 231 may output sound signals related to functions (for example, receiving a call signal, receiving a message, reproducing a music file, etc.) performed in the electronic device 200.

The microphone 232 receives an external sound signal in the call mode, the recording mode, or the voice recognition mode and processes the sound signal to be electrical voice data. In the call mode, the processed voice data may be converted into a format that may be output through the communication unit 250 and then may be transmitted to a mobile communication base station. Various noise removal algorithms for removing noise generated in a process of receiving the external sound signal may be implemented for the voice signal received from the microphone 232.

The interface unit 240 serves as an interface to all external devices connected to the electronic device 200. The interface unit 240 receives data or power from the external device, and delivers the data or power to each internal element of the electronic device 200 or transmits data in the electronic device 200 to the external device. For example, the interface unit 240 may include a wired/wireless headset port, an external charger port, a wired/wireless data port, a memory card port, a port for connecting a device having an identification module, an audio input/output port, a video input/output port, an earphone port, etc.

The communication unit 250 may perform a voice call, a video call, or data communication with the external device (for example, a wireless communication system or another electronic device) through the network under control of the controller 210. The communication unit 250 may include a radio frequency (RF) transmitter for up-converting and amplifying a frequency of a transmitted signal, and an RF receiver for low noise-amplifying and down-converting a received signal. For example, the communication unit 250 may be connected to the network through wireless or wired communication so as to communicate with the external device. The communication unit 250 may include a mobile communication module (for example, a 3rd-generation mobile communication module, a 3.5-generation mobile communication module, a 4th-generation mobile communication module, or a 5th-generation mobile communication module), a digital broadcasting module (for example, a digital multimedia broadcasting (DMB) module), and a short-range communication module (for example, a Wi-Fi module, a Bluetooth module, and a near field communication (NFC) module).

The storage unit 260 may store a program for processing and control by the controller 210 and perform a function of temporarily storing input/output data (for example, a phone book, a message, audio data, a still image, an electronic book, a dynamic image, and the like). The storage unit 260 may also store a use frequency (for example, an application use frequency, a phone number, a message, and a use frequency of multimedia) and importance according to a function execution of the electronic device 200. The storage unit 260 may store data on vibrations and sounds of various patterns output in response to a touch input on the touch screen 220.

The storage unit 260 may include at least one type of storage medium among a flash memory type memory, a hard disk type memory, a micro type memory, a card type memory (for example, a secure digital (SD) card, an eXtream digital (XD) card, and the like), a random access memory (RAM), a static RAM (SRAM), a read-only memory (ROM), an electrically erasable PROM (EEPROM), a programmable ROM (PROM), a magnetic RAM (MRAM), a magnetic disk, and an optical disk. The electronic device 200 may operate in relation to a web (cloud) storage performing a storage function of the storage unit 260 on the Internet.

In addition, the electronic device 200 may be implemented to have more elements or fewer elements than those illustrated in FIG. 2. For example, the electronic device may further include various sensors for detecting various gestures of the user. The sensor may detect a current status of the electronic device 200 such as an opening and closing status, existence or nonexistence of a user's contact, and a bearing/location/acceleration/deceleration of the electronic device 200, and generate a sensing signal. For example, the sensor may include at least one of an infrared sensor, an illumination sensor, a proximity sensor, a color sensor, a gesture sensor, a gyro sensor, an air pressure sensor, a magnetic sensor, an acceleration sensor, a grip sensor, a biometric sensor, and a temperature/humidity sensor.

Figure 3:
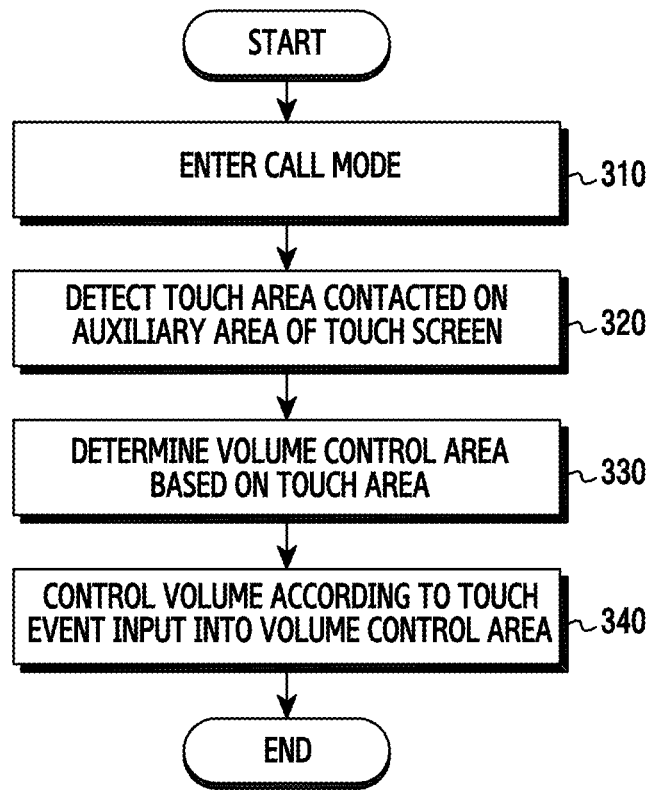
FIG. 3 is a flowchart illustrating a volume control method of an electronic device according to an embodiment of the present disclosure.

FIG. 3 is a flowchart illustrating a volume control method of an electronic device according to an embodiment of the present disclosure. For example, the volume control method illustrated in FIG. 3 is described as below as being performed by the electronic device 200 of FIG. 2.

Referring to FIG. 3, the controller 210 detects entry of the electronic device 200 into a call mode according to a user's input in step 310. For example, when a user interface related to a call button is selected by the user, the controller 210 may determine that the electronic device has entered the call mode. Entering into the call mode does not necessarily mean that a call is made, i.e., connected. For example, when the user makes a phone call, the user enters a counterpart's phone number and then presses the call button. However, the pressing of the call button does not mean an immediate call connection with the counterpart, as the counterpart also presses a call button on their phone in order for the call connection with the counterpart to be made. However, when the user receives a phone call and presses the call button to answer the received phone call from the counterpart, once the call button is pressed, the call connection with the counterpart is made. Accordingly, the controller 210 may determine whether the electronic device enters the call mode according to whether the call button is pressed by the user, regardless of the actual call connection.

When the user interface related to the call button is selected and a display panel of the touch screen 220 is turned off, the controller 210 may determine that the electronic device has entered the call mode. In general, when the user makes a phone call, the user grips the electronic device 200 with his/her hand. At this time, an unintended touch input may be generated by the hand. In order to prevent a malfunction of the electronic device 200 due to the unintended input, the controller 210 may determine whether the electronic device 200 closely approaches the user's ear based on a sensor (for example, infrared sensor or an illumination sensor) after the call button is pressed. For example, when it is determined that the electronic device 200 contacts or approaches the user's ear based on a sensing signal detected by the sensor, the controller 210 may deactivate the display panel by blocking power supplied to the display panel.

When the display panel is deactivated, the display panel is turned off. In this case, the power supplied to the touch panel may be blocked so that the touch panel cannot be used, and a malfunction due to the unintended touch input may be prevented. Accordingly, the controller 210 may determine whether the electronic device 200 enters the call mode according to whether the electronic device 200 contacts or approaches the user's ear regardless of the call connection.

When the phone call with the counterpart is made after the call button is pressed, the controller 210 may determine that the electronic device 200 has entered the call mode. When the user makes the phone call, the phone call with the counterpart may not be connected even though the call button has been pressed. In general, when the call button is pressed, the controller 210 may attempt the call connection to the counterpart's phone number and, after the counterpart presses the call button, connect the call with the counterpart. When the user receives the phone call, once the call button is pressed, the call is immediately connected with the counterpart. Accordingly, when the call is not connected with the counterpart even though the call button is pressed, the controller 210 may determine that the electronic device 200 has not entered the call mode. That is, the controller 210 may determine whether the electronic device 200 enters the call mode according to whether the call is connected with the counterpart.

The controller 210 may determine that the electronic device 200 has entered the call mode when at least one of the aforementioned three conditions is met, or determine that the electronic device 200 has entered the call mode when at least two of the three conditions are met. For example, when the display panel is turned off and the call is connected, the controller 210 may determine that the electronic device 200 has entered the call mode.

When the controller 210 determines that the electronic device 200 has entered the call mode, the controller 210 detects a touch area contacted on the auxiliary area of the touch screen 220 in step 320.

In accordance with an embodiment of the present disclosure, the touch screen 220 is formed on the front surface of the electronic device 200 and also the side surfaces. Accordingly, when the electronic device 200 enters the call mode, the controller 210 may deactivate the main area 110 by blocking power supplied to the main area 110 of the touch screen 220 and activate the first auxiliary area 120a and/or the second auxiliary area 120b by supplying power to the first auxiliary area 120a and/or the second auxiliary area 120b of the touch screen 220. In this case, the first auxiliary area 120a and/or the second auxiliary area 120b of the touch screen 220 may detect a touch input generated by the user's hand gripping the electronic device 200. The first auxiliary area 120a and/or the second auxiliary area 120b may transfer a touch signal corresponding to a location and an area according to the detected touch input to the controller 210, and the controller 210 may detect a touch area contacted on the first auxiliary area 120a and/or the second auxiliary area 120b based on the touch signal.

The controller 210 may determine whether the touch signal corresponding to the contact on the first auxiliary area 120a and/or the second auxiliary area 120b is maintained for a preset time or longer and, when the touch signal is maintained for the preset time or longer, perform steps 330 and 340 described below. When the touch signal is not maintained for the preset time or longer, the controller 210 may detect the touch area contacted on the first auxiliary area 120a and/or the second auxiliary area 120b again. The controller 210 may perform steps 330 and 340 described below based on the touch area detected again. Alternatively, the controller 210 may determine whether the touch area is periodically changed and, when the touch area is changed, perform steps 330 and 340 described below based on the changed touch area.

In step 330, the controller 210 determines a volume control area based on the detected touch area. The volume control area is an area for turning the volume up/down, and the entire or a part of the auxiliary area (for example, the first auxiliary area 120a or the second auxiliary area 120b of FIG. 1C) may be used as the volume control area.

According to an embodiment of the present disclosure, the controller 210 may determine only one of the auxiliary areas (the first auxiliary area 120a or the second auxiliary area 120b of FIG. 1C) of the touch screen 220 as the volume control area or determine both the first auxiliary area 120a and the second auxiliary area 120b of the touch screen 220 as the volume control areas.

For example, when only one auxiliary area (for example, the first auxiliary area 120a of FIG. 1C) is determined as the volume control area, the controller 210 may divide the first auxiliary area 120a into two areas and set one area as a volume up area and the other area as a volume down area. Alternatively, the controller 210 may determine only the second auxiliary area 120b as the volume control area.

Further, when both the first auxiliary area 120a and the second auxiliary area 120b are determined as the volume control areas, the controller 210 may set the first auxiliary area 120a as the volume up area and the second auxiliary area 120b as the volume down area. Alternatively, the reverse is possible.

The controller 210 controls the volume according to a touch event input into the volume control area in step 340. The controller 210 may control to turn the volume up when the touch event is input into the volume up area, and to turn the volume down when the touch event is input into the volume down area.

Figure 4A:
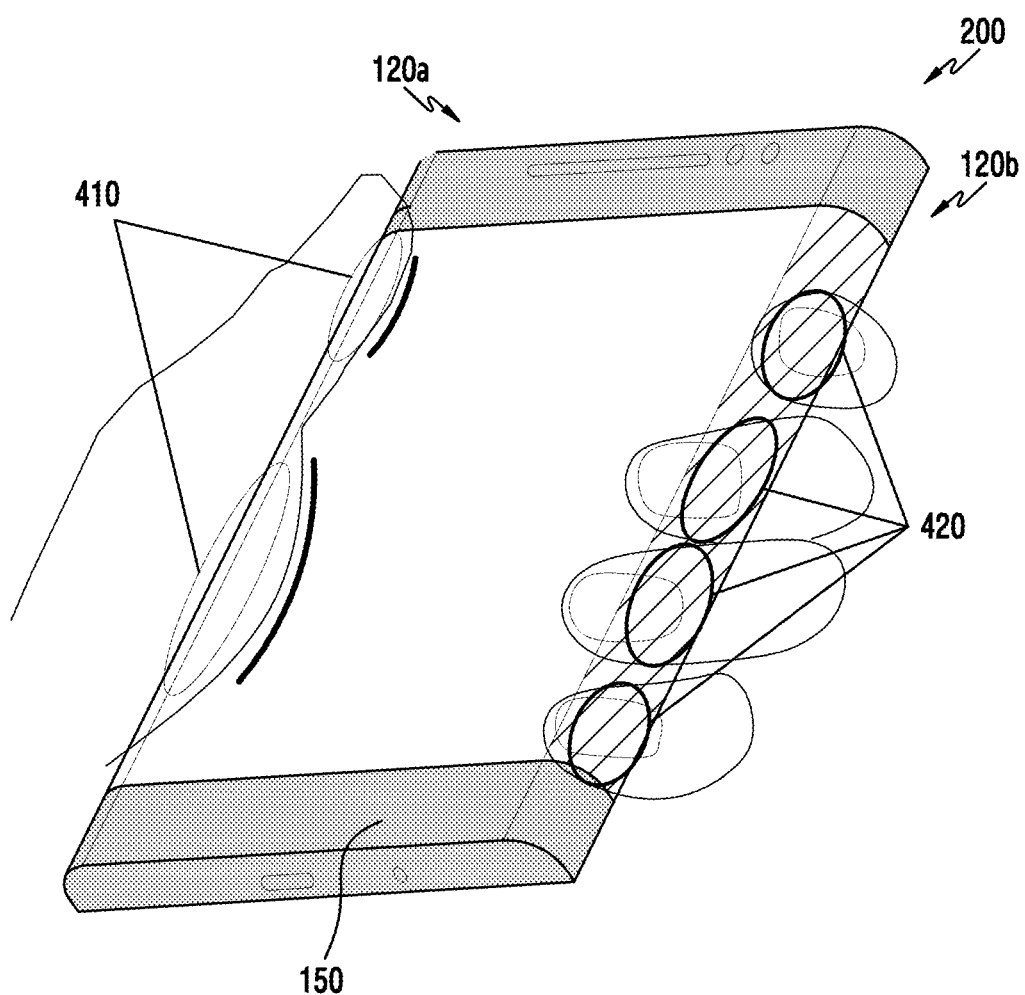
FIGS. 4A and 4B illustrate examples for detecting a touch area according to various embodiments of the present disclosure.
Figure 4B:
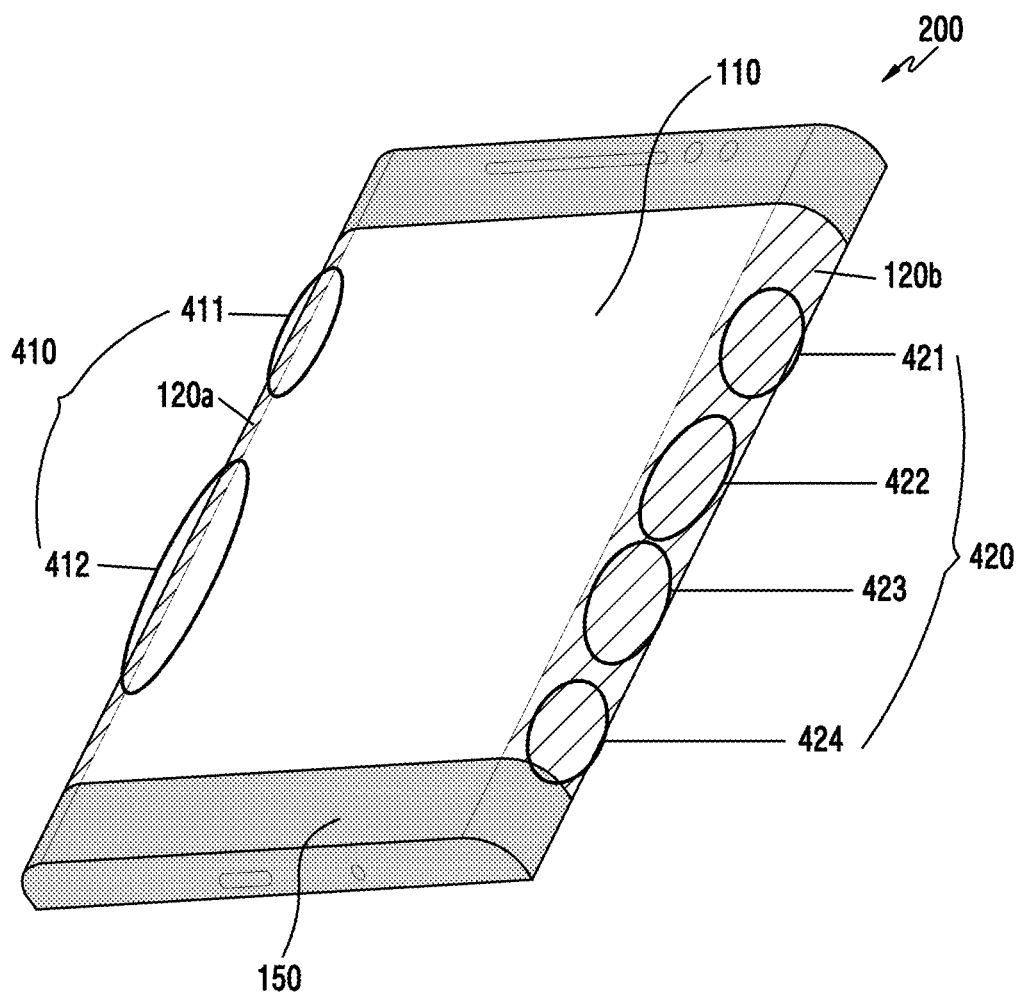

FIGS. 4A and 4B illustrate examples for detecting a touch area according to various embodiments of the present disclosure.

FIG. 4A illustrates an example of a touch area detected when the user grips the electronic device 200 with his/her left hand. Reference numeral 410 indicates a touch area contacted by the user's thumb and the user's hand connected with the thumb on the first auxiliary area 120a. Reference numeral 420 indicates a touch area where the remaining four fingers except for the thumb contact the second auxiliary area 120b.

FIG. 4B illustrates the touch area in detail. Reference numeral 411 indicates a touch area detected by a contact of the thumb on the first auxiliary area 120a. Reference numeral 412 indicates a touch area detected by a contact of the user's hand connected with the thumb on the first auxiliary area 120a. That is, the first auxiliary area 120a may detect touch signals in two touch areas including the upper touch area 411 and the lower touch area 412, and transfer the detected touch signals to the controller 210. The controller 210 may calculate that the number of touch areas contacted on the first auxiliary area 120a is two based on the touch signals and calculate two touch spatial areas. The controller 210 may determine whether the user's hand gripping the electronic device 200 corresponds to the thumb based on the number and size of the spatial area of touch areas.

In general, the number of touch areas where the thumb contacts the electronic device 200 may be smaller than the number of touch areas where the other four fingers contact the electronic device 200. In consideration of this point, the electronic device 200 may set the reference number. Further, since the thumb is larger than the other four fingers, the size of the spatial area on the electronic device 200, which is contacted by the thumb, may be larger. In consideration of this point, the electronic device 200 may set a reference touch spatial area. The reference touch spatial area may be equal to or smaller than the touch spatial area of the thumb and larger than the touch spatial area of the other four fingers. The controller 210 may determine whether the number of touch areas contacted on first auxiliary area 120a is equal to or smaller than the reference number (for example, two) and whether the spatial area of the touch area is larger than the reference touch spatial area. When the number of touch areas contacted on the first auxiliary area 120a is two, which is smaller than the reference number and when one of the touch areas 412 is larger than the reference touch spatial area, the controller 210 may determine that the finger, which contacts the first auxiliary area 120, is the thumb.

Reference numeral 421 indicates a touch area detected by a contact of the index finger on the second auxiliary area 120b. Reference numeral 422 indicates a touch area detected by a contact of the middle finger on the second auxiliary area 120b. Reference numeral 423 indicates a touch area detected by a contact of the ring finger on the second auxiliary area 120b. Reference numeral 424 indicates a touch area detected by a contact of the little finger on the second auxiliary area 120b. That is, the second auxiliary area 120b may detect a touch signal in the locations 421 to 424, which four fingers contact, and transfer the detected touch signal to the controller 210. Based on the detected touch signal, the controller 210 may calculate that the number of touch areas contacted on the second auxiliary area 120b as being four and calculate each of the four touch spatial areas.

For example, the controller 210 may determine whether the number of touch areas contacted on the second auxiliary area 120b is larger than the reference number and whether the spatial area of the touch area is equal to or smaller than the reference touch area. When the number of touch areas contacted on the second auxiliary area 120b is four, which is larger than the reference number and when the spatial area of the touch areas 421 to 424 is equal to or smaller than the reference touch spatial area, the controller 210 may determine that the finger, which contacts the second auxiliary area 120b, is not the thumb.

Further, the controller 210 may determine whether the hand of the user gripping the electronic device 200 is the left hand or the right hand based on the number and spatial area of touch areas contacted on each of the first auxiliary area 120a and the second auxiliary area 120b. For example, even though the number of touch areas contacted on the first auxiliary area 120a is the same as the number of touch areas contacted on the second auxiliary area 120b, the controller 210 may determine whether the auxiliary area contacted by the thumb is the first auxiliary area 120a or the second auxiliary area 120b according to whether one of the touch areas is larger than the reference touch spatial area. The controller 210 may determine that the auxiliary area, on which the touch area larger than the reference touch spatial area is contacted, is contacted by the thumb, and determine whether the hand of the user gripping the electronic device 200 is the left hand or the right hand on the basis of a location of the thumb when the user grips the electronic device 200.

Figure 5:
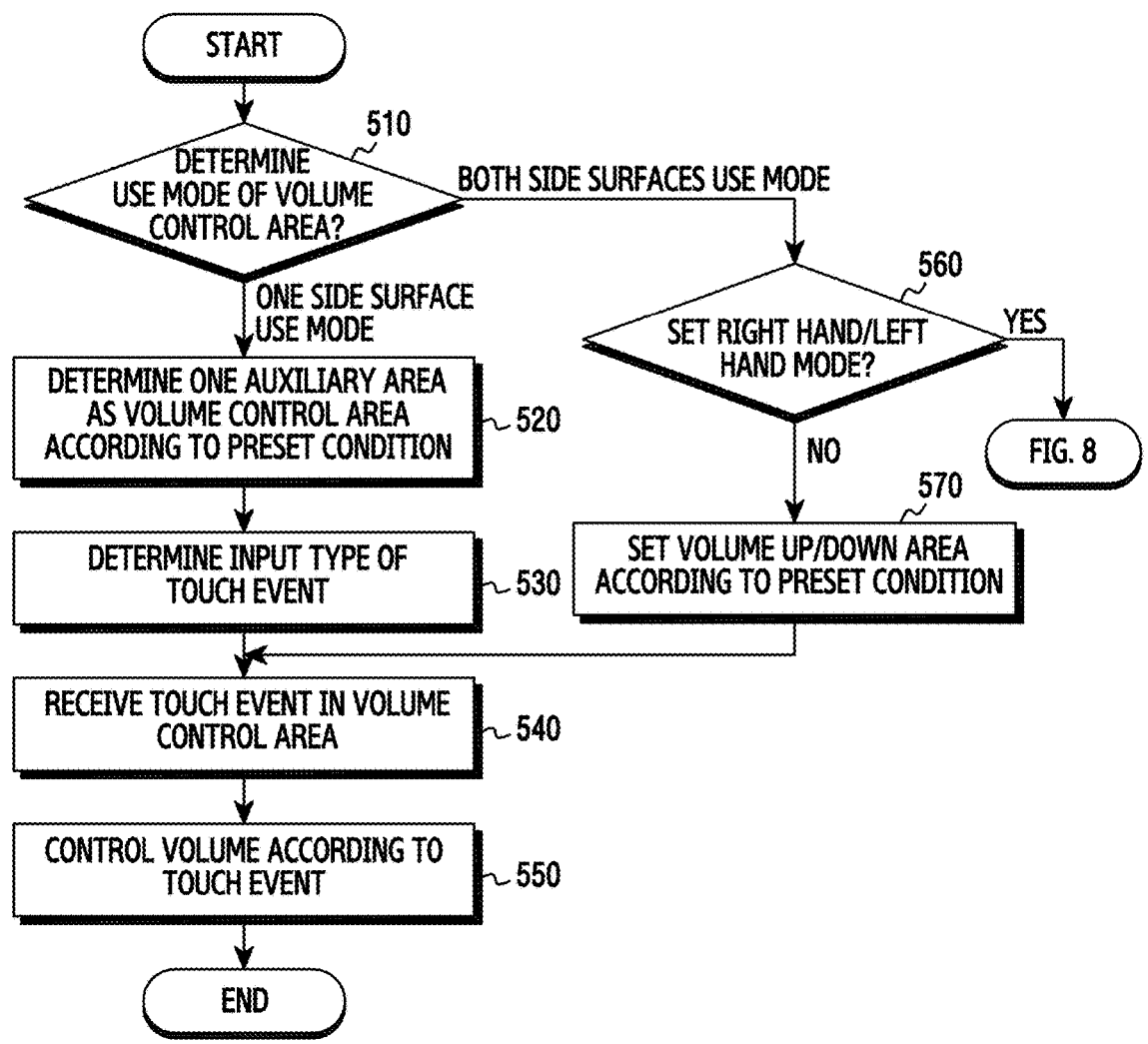
FIG. 5 is a flowchart illustrating a volume control method based on a use mode of a volume control area according to an embodiment of the present disclosure.

FIG. 5 is a flowchart illustrating a volume control method based on a use mode of a volume control area according to an embodiment of the present disclosure. For example, the volume control method illustrated in FIG. 5 is described as below as being performed by the electronic device 200 of FIG. 2.

Referring to FIG. 5, when determining the volume control area based on the touch area, the controller 210 determines a use mode of the volume control area in step 510. The use mode of the volume control area may be divided into a "one side surface use mode" in which only one auxiliary area of the touch screen 220 is used as the volume control area, and a "both side surfaces use mode" in which both the first auxiliary area 120a and the second auxiliary area 120b of the touch screen 220 are used as the volume control area.

First, the "one side surface use mode" will be described.

In step 520, the controller 210 determines one auxiliary area as the volume control area according to a preset condition. All or some of the auxiliary area (for example, the first auxiliary area 120*a* or the second auxiliary area 120*b* of FIG. 1C) may be used as the volume control area. For example, when the first auxiliary area 120*a* is determined as the volume control area, the controller 210 may divide the first auxiliary area 120*a* into two areas and set one area as a volume up area and the other area as a volume down area. Further, when both the first auxiliary area 120*a* and the second auxiliary area 120*b* are determined as the volume control areas, the controller 210 may set the first auxiliary area 120*a* as the volume up area and the second auxiliary area 120*b* as the volume down area.

When the auxiliary area is formed only on one side surface of the touch screen 220, the side surface on which the auxiliary area is formed may be determined as the volume control area. For example, when the auxiliary area is formed only on the left side surface of the main area 110, the controller 210 may determine the first auxiliary area 120*a* as the volume control area. Alternatively, when the auxiliary area is formed only on the right side surface of the main area 110, the controller 210 may determine the second auxiliary area 120*b* as the volume control area.

When the auxiliary area is formed on both side surfaces of the touch screen 220, the controller 210 may consider that the hand, which is generally used in a phone call, is the right hand and determine the auxiliary area, which may be easily controlled by the right hand, as the volume control area. For example, the controller 210 may determine the first auxiliary area 120*a* arranged on the left side of the main area 110 as the volume control area such that the volume may be controlled by the remaining four fingers except for the thumb. Alternatively, the controller 210 may determine the second auxiliary area 120*b* arranged on the right side of the main area 110 as the volume control area such that the volume may be controlled by the thumb.

Alternatively, when the electronic device 200 is set as a left hand mode, the controller 210 may determine the auxiliary area, which may be easily controlled by the left hand according to the setting of the electronic device 200, as the volume control area.

The auxiliary area to be used as the volume control area may be determined according to whether the hand of the user gripping the electronic device 200 is the right hand or the left hand. As described above with reference to FIG. 4B, the controller 210 may determine whether the hand of the user gripping the electronic device 200 is the right hand or the left hand based on the touch area.

First, an example in which the controller 210 determines the auxiliary area contacted by the remaining four fingers except for the thumb as the volume control area will be described.

When it is determined that the user grips the electronic device 200 with his/her left hand based on the touch area, the controller 210 may determine that the second auxiliary area 120*b* arranged on the right of the main area 110 as the volume control area as illustrated in FIG. 4B. In contrast, when it is determined that the user grips the electronic device 200 with his/her right hand based on the touch area, the controller 210 may determine the first auxiliary area 120*a* arranged on the left of the main area 110 as the volume control area. In this case, the controller 210 may determine an input type of a touch event as a "tap touch".

Alternatively, an example in which the controller 210 determines the auxiliary area contacted by the thumb as the volume control area will be described.

When it is determined that the user grips the electronic device 200 with his/her left hand based on the touch area, the controller 210 may determine that the first auxiliary area 120*a* arranged on the left of the main area 110 as the volume control area as illustrated in FIG. 4B. In contrast, when it is determined that the user grips the electronic device 200 with his/her right hand based on the touch area, the controller 210 may determine the second auxiliary area 120*b* arranged on the right of the main area 110 as the volume control area. In this case, the controller 210 may determine an input type of a touch event as a "swipe touch".

As described above, when the auxiliary area to be used as the volume control area is determined according to whether the hand of the user gripping the electronic device 200 is the right hand or the left hand, the controller 210 may reset the volume control area periodically or based on the touch area contacted for a preset time. That is, the controller 210 may periodically detect the touch area even during the call, determine whether the hand of the user gripping the electronic device 200 is changed, and, when it is determined that the hand is changed, set again the volume control area based on the detected touch area.

Accordingly, a condition for setting the volume control area may be set by default in the electronic device 200 based on the conditions or set by the user.

In step 530, the controller 210 determines an input type of the touch event. For example, the touch event for the touch screen 220 may include tapping, double tapping, sliding, dragging, flicking, swiping, pinching, and spreading. Further, the touch event may include a hovering event using a proximity signal. However, the present disclosure uses an example in which the input type is one of the tap touch and the swipe touch. However, the present disclosure is not limited by this example.

Although steps 520 and 530 are described as independent steps occurring in series, step 530 may be performed simultaneously with step 520. That is, when the volume control area is determined according to the touch area, the input type of the touch event may be determined according to the determined volume control area. For example, when the first auxiliary area 120*a* is determined as the volume control area in accordance with the user's right hand in step 520, the controller 210 may determine the input type of the touch event as the "tap touch". When the second auxiliary area 120*b* is determined as the volume control area in step 520, the controller 210 may determine the input type of the touch event as the "swipe touch".

Figure 6A:
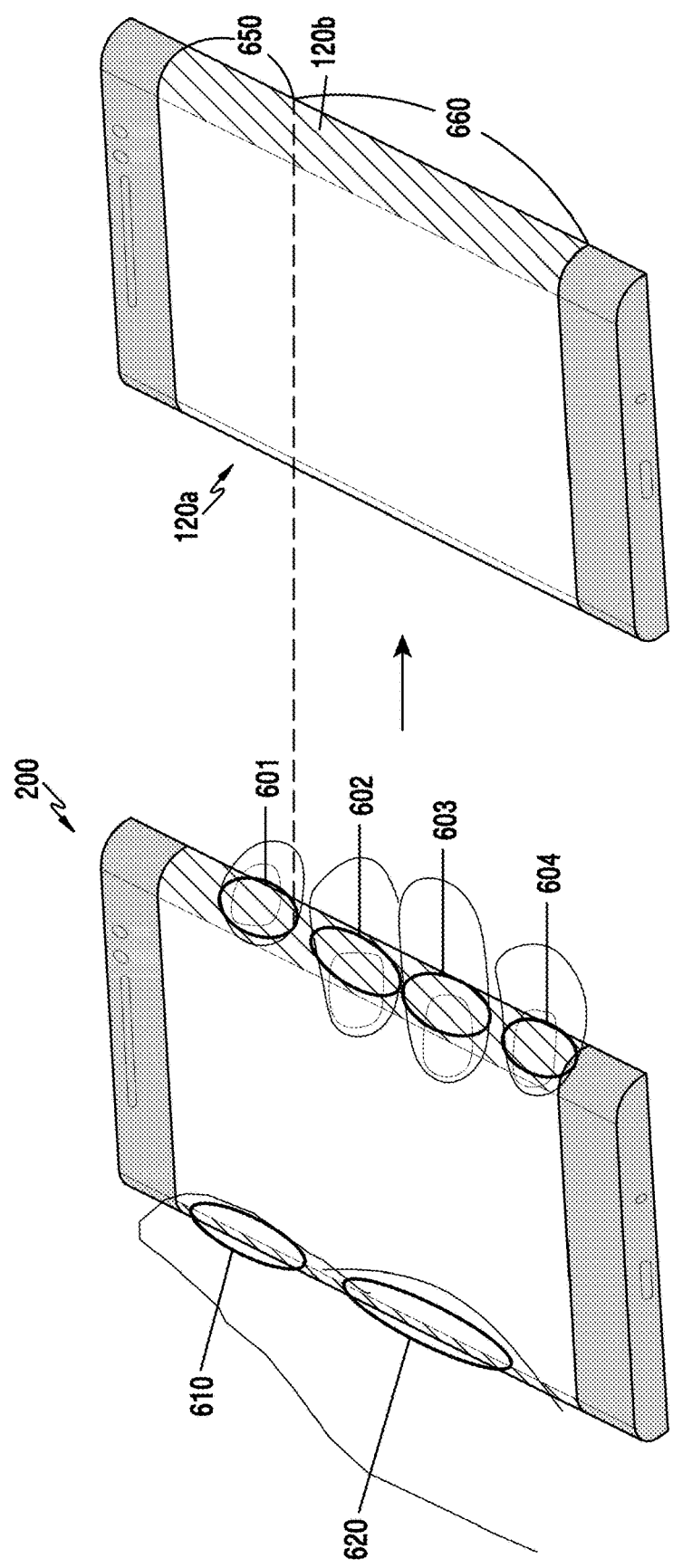
FIGS. 6A and 6B illustrate examples for determining a volume up/down area of a tap input type according to various embodiments of the present disclosure.
Figure 6B:
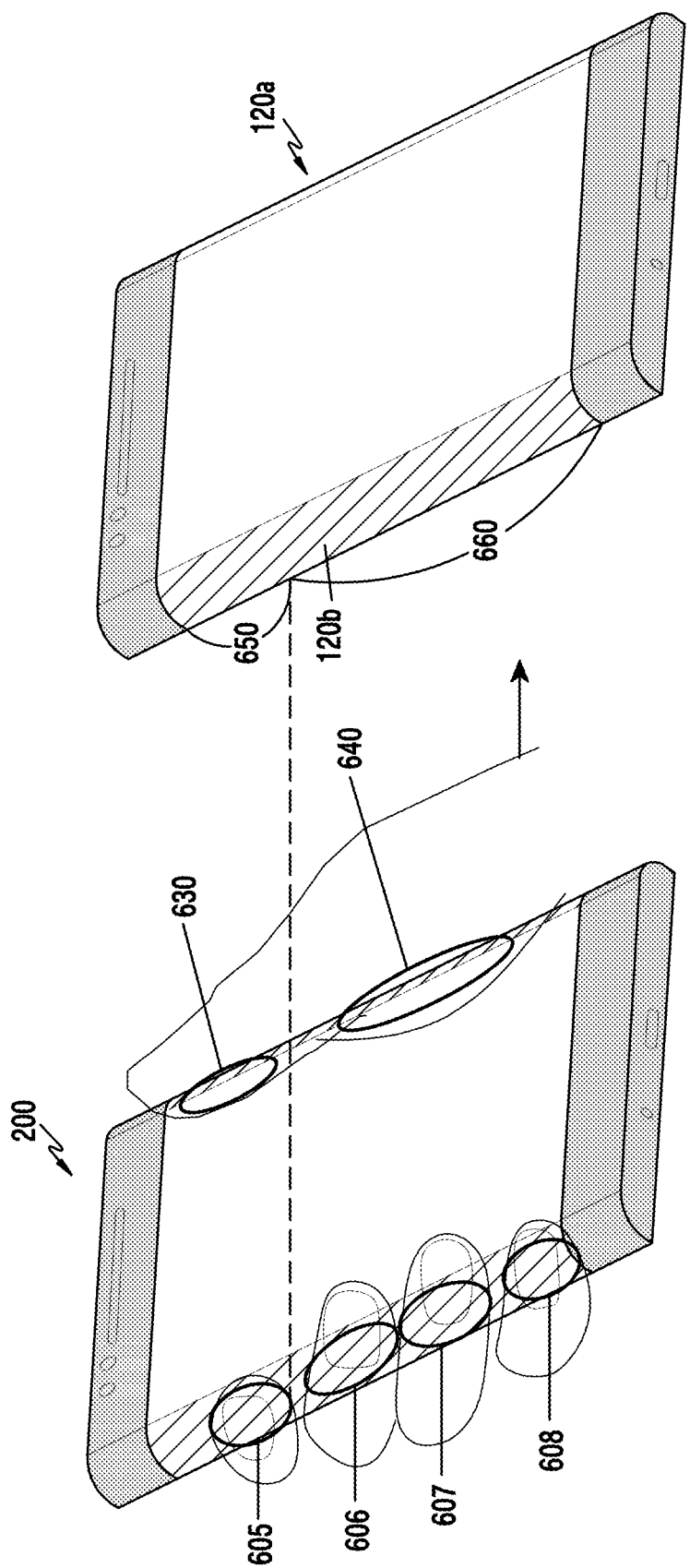

In step 540, the controller 210 receives a touch event in the volume control area. The touch screen 220 may recognize one touch point basically and also recognize several touch points at the same time. For example, when the volume up/down area is determined as illustrated in FIG. 6A or 6B, the touch screen 220 may receive not only a touch contacted to grip the electronic device 200 but also a touch signal corresponding to tapping for the volume control. The touch screen 220 may deliver the touch signal corresponding to the tapping to the controller 210, and the controller 210 may receive the touch signal and recognize that the touch event corresponding to the tapping is generated.

In step 550, the controller 210 controls the volume according to the touch event. For example, when the touch event is generated in the volume up area, the controller 210 may turn the volume up. Alternatively, when the touch event is generated in the volume down area, the controller 210 may turn the volume down. However, the controller 210 may turn the volume up/down sequentially according to a volume control level of the electronic device 200. For example, when a current volume level is 5 and the touch event is generated in the volume up area, the controller 210 may increase the volume level to be volume level 6. Alternatively, when the current volume level is 5 and the touch event is generated in the volume down area, the controller 210 may decrease the volume level to be volume level 4. Alternatively, when the touch event is successively generated, the controller 210 may successively control the volume level.

The "both side surfaces use mode" will be described below.

Figure 8:
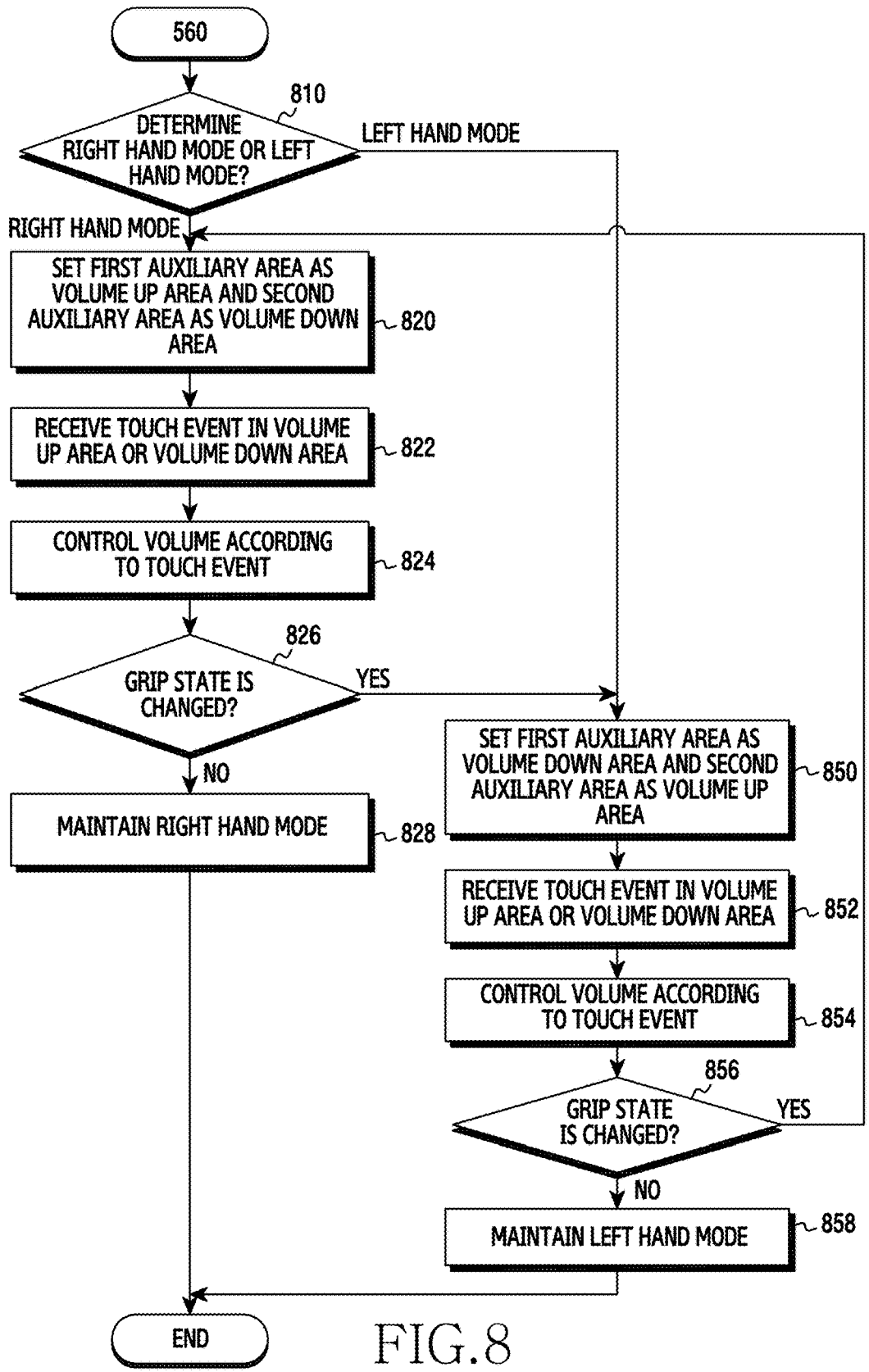
FIG. 8 is a flowchart illustrating a volume control method based on a user hand control mode according to an embodiment of the present disclosure.

In the "both side surfaces use mode", in step 560, the controller 210 determines whether a right hand/left hand mode is internally set to the electronic device 200. When the right hand/left hand mode is set in step 5, a method as illustrated in FIG. 8 is performed.

However, when the right hand/left hand mode is not set in step 560, the controller 210 sets the volume up/down area according to a condition preset to the electronic device 200 in step 570. For example, the controller 210 may set the first auxiliary area 120a formed on the left of the main area 110 as the volume up area and the second auxiliary area 120b formed on the right of the main area 110 as the volume down area. In contrast, the controller 210 may set the first auxiliary area 120a formed on the left of the main area 110 as the volume down area and the second auxiliary area 120b formed on the right of the main area 110 as the volume up area.

When the volume up/down area is completely set, the controller 210 performs steps 540 and 550 to turn the volume up or down according to a touch event.

An example in which the input type of the touch event is determined as the "tap touch" is first described.

The controller 210 may divide the auxiliary area determined as the volume control area into two areas, and set one area as the volume up area and the other area as the volume down area.

FIGS. 6A and 6B illustrate examples for determining the volume up/down area of the tap input type according to various embodiments.

FIG. 6A illustrates an example for determining the volume up/down area according to a touch area when the user grips the electronic device 200 with his/her left hand.

Referring to FIG. 6A, reference numeral 610 indicates a touch area contacted by the thumb on the first auxiliary area 120a, and reference numeral 620 indicates a touch area contacted by the hand connected with the thumb on the first auxiliary area 120a. Reference numerals 601 to 603 indicate touch areas contacted by the remaining four fingers except for the thumb on the second auxiliary area 120b. The controller 210 may determine the second auxiliary area 120b contacted by the remaining four fingers except for the thumb as the volume control area. The controller 210 may determine the volume up/down area based on the touch area 601 contacted on the uppermost portion of the second auxiliary area 120b. For example, the controller 210 may set an area from an upper side surface of the electronic device 200 to a location of the touch area 601 as a volume up area 650 and an area from a location below the touch area 601 to a lower side surface of the electronic device 200 as a volume down area 660. Alternatively, the reverse is possible.

FIG. 6B illustrates an example for determining the volume up/down area according to a touch area when the user grips the electronic device 200 with his/her right hand.

Referring to FIG. 6B, reference numerals 605 to 608 indicate touch areas contacted by the remaining four fingers except for the thumb on the first auxiliary area 120a. Reference numeral 630 indicates a touch area contacted by the thumb on the second auxiliary area 120b, and reference numeral 640 indicates a touch area contacted by the hand connected with the thumb on the second auxiliary area 120b. The controller 210 may determine the first auxiliary area 120a contacted by the remaining four fingers except for the thumb as the volume control area. The controller 210 may determine the volume up/down area based on the touch area 605 contacted on the uppermost portion of the first auxiliary area 120a. For example, the controller 210 may set an area from an upper side surface of the electronic device 200 to a location of the touch area 605 as the volume up area 650 and an area from a location below the touch area 605 to a lower side surface of the electronic device 200 as the volume down area 660. Alternatively, the reverse is possible.

An example in which the input type of the touch event is determined as the "swipe touch" is described. When the input type of the touch event is the "swipe touch", the controller 210 may turn the volume up or down according to a movement direction of the touch event input into the volume control area.

Figure 7:
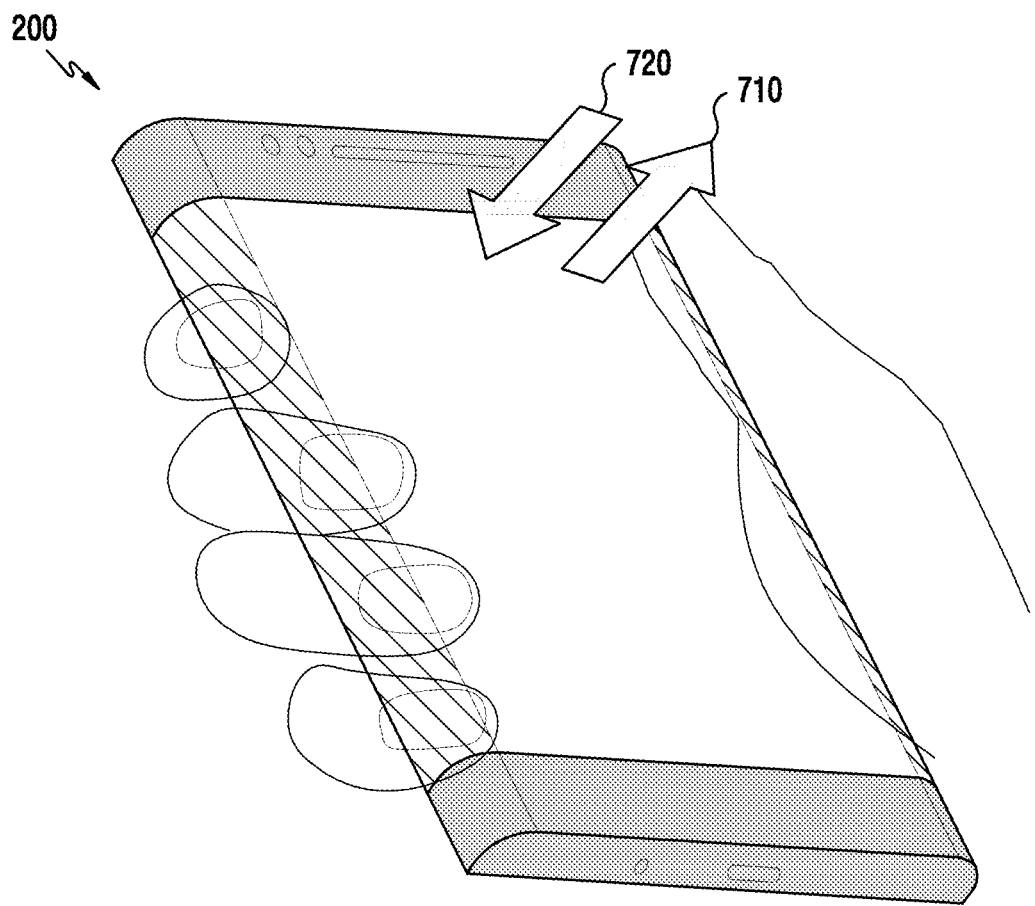
FIG. 7 illustrates an example for controlling a volume by using a swipe input type according to an embodiment of the present disclosure.

FIG. 7 illustrates an example for controlling the volume by using the swipe input type according to an embodiment of the present disclosure.

Referring to FIG. 7, when the user grips the electronic device 200 with his/her right hand, the controller 210 may determine the second auxiliary area 120b contacted by the thumb as the volume control area. When a touch event input into the second auxiliary area 120b moves in a direction 720 of the rear surface from the main area 110 on the front surface, the controller 210 may turn the volume up.

The rear surface may be a surface opposite to the front surface on which the display panel is installed and hidden by the palm of the user. That is, when the touch starting at the main area 110 on the front surface moves in an outer direction 720 of the rear surface and then is released, the touch screen 220 may deliver a generated touch signal to the controller 210. The controller 210 may calculate a touch trace based on a location of the received touch signal. The touch trace is a change in location, and the controller 210 may determine a movement direction of the touch signal based on the touch trace. For example, the controller 210 may determine that the movement direction of the touch signal is the outer direction 720 based on the trace and turn the volume up.

When a touch event input into the second auxiliary area 120b moves in an inner direction 710 of the main area 110 on the front surface from the rear surface, the controller 210 may turn the volume down. That is, when the touch starting at the rear surface moves in the inner direction 710 of the main area 110 and then is released, the touch screen 220 may deliver a generated touch signal to the controller 210. The controller 210 may calculate a trace based on a location of the received touch signal and determine a movement direction of the touch signal based on the trace. For example, the controller 210 may determine that the movement direction of the touch signal is the inner direction 710 and turn the volume down.

The controller 210 may recognize the volume up when the movement direction of the touch event is the outer direction 720, and recognize the volume down when the movement direction of the touch event is the inner direction 710. Alternatively, the reverse is possible.

The controller 210 may recognize the volume up when the movement direction of the touch event is a top direction, and recognize the volume down when the movement direction of the touch event is a bottom direction. Alternatively, the reverse is possible.

The movement direction related to the volume up/down may be determined according to a condition set to the electronic device 200 and the up/down direction is not limited to one direction.

FIG. 8 is a flowchart illustrating a volume control method based on a user's hand control mode according to an embodiment of the present disclosure. For example, the volume control method illustrated in FIG. 8 is described as below as being performed by the electronic device 200 of FIG. 2.

Referring to FIG. 8, when the right hand/left hand mode is set to the electronic device 200, the controller 210 determines whether the mode set to the electronic device 200 is the right hand mode or the left hand mode in step 810.

First, a case where the right hand mode is set to the electronic device 200 is described.

In step 820, the controller 210 sets the first auxiliary area 120*a* as the volume up area and the second auxiliary area 120*b* as the volume down area. For example, the controller 210 may determine an input type of a touch event as a "tap touch".

Referring to FIG. 6B, in the right hand mode, the controller 210 may turn the volume up through the remaining four fingers and turn the volume down through the thumb. This is set for the user's convenience. The controller 210 may also set the first auxiliary area 120*a* as the volume down area and the second auxiliary area 120*b* as the volume up area. That is, the controller 210 may turn the volume down through the remaining four fingers and turn the volume up through the thumb.

Referring again to FIG. 8, in step 822, the controller 210 receives a touch event in the volume up area or the volume down area. The touch screen 220 may detect a touch signal generated in the first auxiliary area 120*a* and the second auxiliary area 120*b* and deliver the detected touch signal to the controller 210. When receiving the touch signal, the controller 210 may recognize the generation of the touch event.

In step 824, the controller 210 controls the volume according to the touch event. The controller 210 may determine whether the touch event is generated in the volume up area or the volume down area. When the touch event is generated in the volume up area (for example, the first auxiliary area 120*a*), the controller 210 may turn the volume up. Alternatively, when the touch event is generated in the volume down area (for example, the second auxiliary area 120*b*), the controller 210 may turn the volume down.

In step 826, the controller 210 determines whether a grip state of the electronic device 200 is changed. In the volume control method performed in the right hand mode, when the hand of the user gripping the electronic device 200 is changed to the left hand, it is required to change the volume control area. Accordingly, the controller 210 may periodically re-detect the touch area or re-detect the touch area contacted for a predetermined time.

When the grip state is not changed in step 826, the controller 210 maintains the right hand mode in step 828.

However, when the grip state is changed to the left hand based on the determination of the grip state of the electronic device based on the re-detected touch area, the controller 210 performs step 850.

After the grip state is changed in step 826 or when the left hand mode is determined in step 810, the controller 210 sets the first auxiliary area 120*a* as the volume down area and the second auxiliary area 120*b* as the volume up area in step 850. For example, the controller 210 may determine an input type of a touch event as a "tap touch".

Referring to FIG. 6A, in the left hand mode, the controller 210 may turn the volume up through the remaining four fingers and turn the volume down through the thumb. This is set for the user's convenience. The controller 210 may also set the first auxiliary area 120*a* as the volume down area and the second auxiliary area 120*b* as the volume up area. That is, the controller 210 may turn the volume down through the remaining four fingers and turn the volume up through the thumb.

Referring again to FIG. 8, in step 852, the controller 210 receives a touch event in the volume up area or the volume down area. The touch screen 220 may detect a touch signal generated in the first auxiliary area 120*a* and the second auxiliary area 120*b* and deliver the detected touch signal to the controller 210. When receiving the touch signal, the controller 210 may recognize the generation of the touch event.

In step 854, the controller 210 controls the volume according to the touch event. The controller 210 may determine whether the touch event is generated in the volume up area or the volume down area. When the touch event is generated in the volume up area (for example, the second auxiliary area 120*b*), the controller 210 may turn the volume up. Alternatively, when the touch event is generated in the volume down area (for example, the first auxiliary area 120*a*), the controller 210 may turn the volume down.

In step 856, the controller 210 determines whether a grip state of the electronic device 200 is changed. In the volume control method performed in the left hand mode, when the hand of the user gripping the electronic device 200 is changed to the right hand, the volume control area must be changed. Accordingly, the controller 210 may periodically re-detect the touch area or re-detect the touch area contacted for a predetermined time.

When the grip state is not changed based on the determination of the grip state of the electronic device based on the re-detected touch area, the controller 210 maintains the left hand mode in step 858.

However, when the grip state is changed to the right hand in step 856, the controller 210 performs step 820.

As described above, when entering a call mode, the controller 210 may recognize a voice input from the microphone 232 and control the volume according to the level of the voice. When recognizing the voice, the controller 210 may recognize ambient noise and remove the noise, so as to recognize only the user's voice. When a reference value related to the volume control level is determined, the controller 210 may control the volume to be a volume of the reference value corresponding to the level of the voice without controlling the volume sequentially. The volume control level may have 10 levels. A reference value of a first level may be 1 dB, and a reference value of a tenth level may be 10 dB. When the level of a current volume corresponds to 5 dB and the level of the voice input from the microphone 232 corresponds to 3 dB, the controller 210 may directly control the volume from 5 dB to 3 dB, skipping over 4 dB.

The controller 210 may also assign priorities to the method of determining the volume control area according to the touch area and the method of determining the volume according to the level of the volume, and control the volume through the higher priority method. Alternatively, the controller 210 may change the priority according to the circumstances. Alternatively, based on conditions preset to the electronic device 200, the controller 210 may control the volume through one of the methods of controlling the volume control area according to the touch area and the method of controlling the volume according to the level of the volume.

When entering the call mode, the controller 210 may switch to a speaker mode if the electronic device 200 is spaced apart from the user by a predetermined distance or longer based on a sensing signal received from a sensor. For example, when a sensing signal output from a light emitting unit of an infrared sensor is not input into a light receiving unit, the controller 210 may determine that the electronic device 200 is spaced apart from the user by a predetermined distance or longer. The controller 210 may display a popup window for inquiring about whether to switch to the speaker mode on the touch screen 220.

When the user makes a request for switching to the speaker mode, the controller 210 may activate the speaker 231 and switch to the speaker mode.

Alternatively, when the electronic device 200 is spaced apart from the user by a predetermined distance or longer, the controller 210 may automatically switch to the speaker mode without displaying the popup window according to the setting of the electronic device 200.

According to various embodiments of the present disclosure, the volume may be controlled using side surface(s) of the touch screen.

According to various embodiments of the present disclosure, when the electronic device enters a call mode, the auxiliary area formed on the side surface(s) of the electronic device may be determined as the volume control area and the volume may be controlled according to a touch event input into the volume control area.

According to various embodiments of the present disclosure, the volume control area may be properly changed according to whether the user's hand gripping the electronic device is the left hand or the right hand, so that the user's convenience may increase.

According to various embodiments of the present disclosure, the volume may be controlled using a touch screen formed on the side surface(s) of the electronic device without a hardware key for controlling the volume on the side surface(s) of the electronic device.

According to various embodiments of the present disclosure, the volume may be more effectively and easily controlled through a more intuitive action compared to the conventional volume control.

According to various embodiments of the present disclosure, inconvenience in finding a volume control button and control the volume during a call may be reduced.

The embodiments disclosed in the present specifications and drawings are provided to describe and to help a thorough understanding of the present disclosure but do not limit the scope of the present disclosure. Therefore, it should be construed that, in addition to the embodiments disclosed herein, all modifications and changes or modified and changed forms derived from the technical idea of the present disclosure fall within the scope of the present disclosure. Accordingly, it should be interpreted that besides the embodiments listed herein, all modifications or modified forms derived based on the technical ideas of the present disclosure are included in the scope of the present disclosure as defined in the claims, and their equivalents.

What is claimed is:

1. An electronic device comprising:
    a touch screen including a main area on a front surface of the electronic device and an auxiliary area formed on at least one side of the electronic device; and
    at least one processor configured to:
        detect at least one touch area where at least one touch input occurs on the auxiliary area during a call mode,
        determine at least a part of the auxiliary area as a volume control area based on the at least one touch area, and
        control volume according to a touch event in the volume control area,
    wherein the touch screen includes a first auxiliary area formed on a side of the electronic device and a second auxiliary area formed on an opposite side of the electronic device,
    wherein the at least one processor is further configured to, when a mode of the volume control area is a both side surfaces use mode, determine the first auxiliary area as a volume up area and the second auxiliary area as a volume down area based on the at least one touch area.

2. The electronic device of claim 1, wherein the at least one processor is further configured to determine that the electronic device enters the call mode when a user interface related to a call button is selected, the main area is deactivated after the user interface related to the call button is selected, or an incoming call from a counterpart is answered.

3. The electronic device of claim 1, wherein the at least one processor is further configured to, when the electronic device enters the call mode, deactivate the main area and to activate the auxiliary area in order to detect the at least one touch input on the auxiliary area.

4. The electronic device of claim 1, wherein the at least one processor is further configured to, when a mode of the volume control area is a one side surface use mode, determine the auxiliary area as the volume control area.

5. The electronic device of claim 1, wherein the at least one processor is further configured to divide the volume control area into a volume up area and a volume down area.

6. The electronic device of claim 5, wherein the at least one processor is further configured to:
    turn the volume up when the touch event is generated in the volume up area, and
    turn the volume down when the touch event is generated in the volume down area.

7. The electronic device of claim 1, wherein the at least one processor is further configured to, when the touch event occurs in the volume control area, turn the volume up or down according to a movement direction of a trace of the touch event.

8. The electronic device of claim 1, wherein the at least one processor is further configured to:
    determine whether a hand of the user gripping the electronic device is a right hand or a left hand based on a number or a spatial size of at least one touch area, and
    determine a volume up area and a volume down area according to whether the hand is the right hand or the left hand.

9. The electronic device of claim 8, wherein the at least one processor is further configured to, if it is determined that the hand of the user is changed based on the number and the spatial size of at least one touch area, change the volume up area and the volume down area.

10. A method of controlling volume of an electronic device comprising a touch screen including a main area on a front surface and an auxiliary area formed on at least one side of the main area, the method comprising:
    entering a call mode;
    detecting at least one touch area where at least one touch input occurs on the auxiliary area;
    determining at least a part of the auxiliary area as a volume control area based on the at least one touch area; and controlling volume according to a touch event in the volume control area, wherein the touch screen includes a first auxiliary area formed on a side of the electronic device and a second auxiliary area formed on an opposite side of the electronic device, and wherein determining the auxiliary area as the volume control area comprises:

when a mode of the volume control area is a both side surfaces use mode, determining the first auxiliary area as a volume up area and the second auxiliary area as a volume down area based on the at least one touch area.

11. The method of claim 10, wherein entering the call mode comprises one of:

determining that a user interface related to a call button is selected;

determining that the main area is deactivated after the user interface related to the call button is selected; and determining that an incoming call from a counterpart is answered.

12. The method of claim 10, wherein detecting the at least one touch area comprises:

deactivating the main area, when the electronic device enters the call mode; and activating the auxiliary area in order to detect the at least one touch input on the auxiliary area.

13. The method of claim 10, wherein determining the auxiliary area as the volume control area comprises:

when a mode of the volume control area is a one side surface use mode, determining the auxiliary area as the volume control area.

14. The method of claim 13, wherein determining the auxiliary area as the volume control area comprises:

dividing the volume control area into a volume up area and a volume down area.

15. The method of claim 14, wherein controlling the volume comprises:

turning the volume up, when the touch event is generated in the volume up area; and turning the volume down, when the touch event is generated in the volume down area.

16. The method of claim 13, wherein controlling the volume comprises:

when the touch event occurs in the volume control area, turning the volume up or down according to a movement direction of a trace of the touch event.

17. The method of claim 10, wherein determining the at least part of the auxiliary area as the volume control area comprises:

determining whether a hand of the user gripping the electronic device is a right hand or a left hand based on a number and a spatial size of at least one touch area; and determining a volume up area and a volume down area according to whether the hand is the right hand or the left hand.

18. The method of claim 17, wherein determining the at least part of the auxiliary area as the volume control area comprises:

if it is determined that the hand of the user is changed based on the number and the spatial size of at least one touch area, changing the volume up area and the volume down area.

* * * * *